United States Patent Office 3,404,196
Patented Oct. 1, 1968

3,404,196
PROCESS FOR IMPROVING THE PROPERTIES OF HARDENED ELASTIC EPOXIDE RESINS
Erwin Weinrich, Dusseldorf-Holthausen, Germany, assignor to Henkel & Cie GmbH, Dusseldorf-Holthausen, Germany, a corporation of Germany
Filed Dec. 20, 1966, Ser. No. 603,210
Claims priority, application Germany, Feb. 16, 1966, H 58,571
6 Claims. (Cl. 260—830)

ABSTRACT OF THE DISCLOSURE

This invention relates to a new process for improving the mechanical properties of hardened epoxide resins without substantially effecting their thermal properties which comprises reacting crystallized triglycidyl isocyanurates with di- or polycarboxylic acid anhydrides and up to 60% by weight of a glycidyl ether of a dihydric phenol during the molding.

CLAIM FOR PRIORITY

Figure 2:
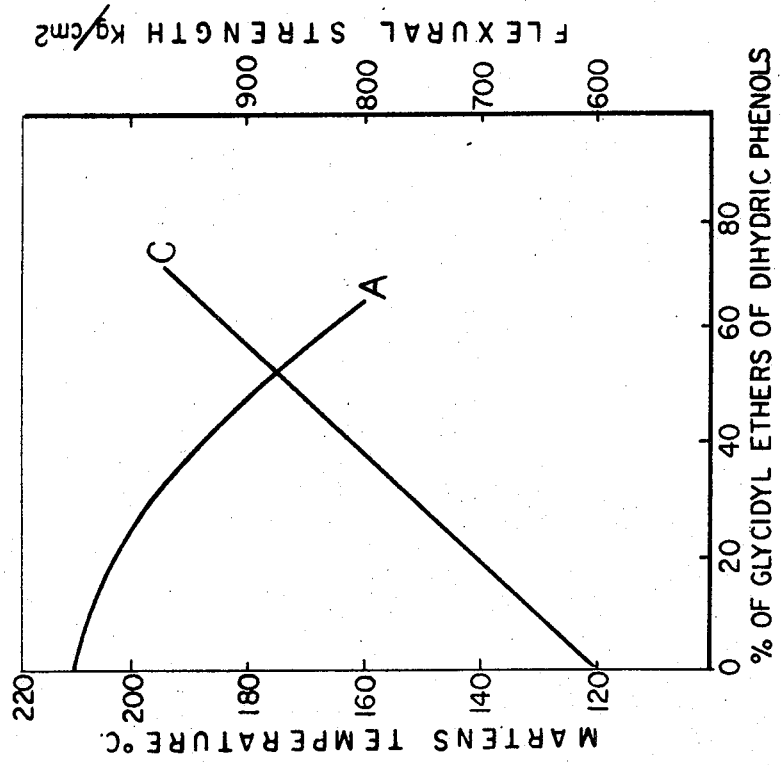

Under provisions of 35 U.S.C. 119, the right of priority is claimed, based on the corresponding German priority application H 58,571, filed Feb. 16, 1966.

THE PRIOR ART

Hardened epoxide resins require for many fields of application a good resistance to deformation under the influence of heat among other properties. In particular, hardened epoxide resins based on crystallized triglycidyl isocyanurate with a content of at least 14% of epoxide oxygen and carboxylic acid anhydrides exhibit this characteristic. On the other hand, these synthetic epoxide resins do not show any optimum values with regard to their mechanical properties, which are manifested in a relatively low impact strength and a low flexural strength. It is generally known to improve the mechanical, in particular the elastic properties of those plastics based on epoxide resins, by addition of softening or plasticizing agents. In addition to the use of the so-called external plasticizers, which involve considerable disadvantages, the mechanical characteristics of hardened epoxide resins can be improved by an addition of reactive aliphatic compounds containing long-chain alkyl radicals or of polyethers to the mixtures to be hardened. For example, it is known to effect a so-called internal softening or plasticizing by means of additions of polypropylene glycols to the hardening mixtures in the hardening of relatively brittle synthetic resins produced from the reaction of polyvalent epoxide compounds with polyvalent carboxylic acid anhydrides. If this known process is employed, for example, in the process of heat hardening of triglycidyl isocyanurate, a noticeable decrease in the resistance to heat deformation occurs in the hardened resin with addition of a relatively small amount of additives. This decrease in thermal resistance is in no way proportioned to the improvement obtained in the mechanical properties such as the impact strength or flexural strength. Accordingly, only an insignificant improvement in the elastic characteristics, that is to say a relatively trifling increase in flexibility of the hardened resin, is achieved, with a very considerable loss of thermal properties.

OBJECTS OF THE INVENTION

An object of the invention is to avoid the shortcomings of the known processes of softening hardened epoxide resins based on triglycidyl isocyanurate, and a further object is the obtention of a method which effects a good flexibility of the hardened epoxide resins with only a slight loss of its thermal characteristics.

A further object of the invention is to develop a process for increasing the flexibility of a hardened epoxide resin based on triglycidyl isocyanurate without substantial effect on its thermal properties which comprises the steps of reacting a mixture consisting of (1) from about 95% to 40% by weight of a crystallized triglycidyl isocyanurate and about 5% to 60% by weight of glycidyl ethers of a dihydric phenol with (2) an organic polycarboxylic acid anhydride epoxide hardener under hardening conditions and recovering said hardened epoxide resin.

Another object of the invention is the production of a hardened epoxide resin based on triglycidyl isocyanurate having both increased flexibility and good thermal properties.

These and other objects of the invention will become more apparent as the description thereof proceeds.

DESCRIPTION OF THE INVENTION

These objects are attained according to the invention in that mixtures, consisting of about 95% to 40% by weight of triglycidyl isocyanurate and about 5% to 60% by weight of glycidyl ethers of dihydric phenols, are reacted with organic di- or polycarboxylic acid anhydrides to obtain the desired hardened epoxide resins.

Preferably the content of glycidyl ethers of dihydric phenols should amount to between 10% to 40% by weight. Especially suitable are resinous glycidyl ethers of diphenylol propane with an epoxide equivalent of 170 to about 1200, preferably about 180 to 450. Also suitable are, for example, glycidyl ethers of chlorinated, brominated or methylated diphenylol propanes. The above indicated glycidyl ethers can be substituted, either entirely or in part, by other glycidyl ethers of dihydric phenols, such as glycidyl ethers of hydroquinone or resorcinol. The epoxide equivalent of these resinous epoxide ethers should be between 170 and 1200.

Figure 1:
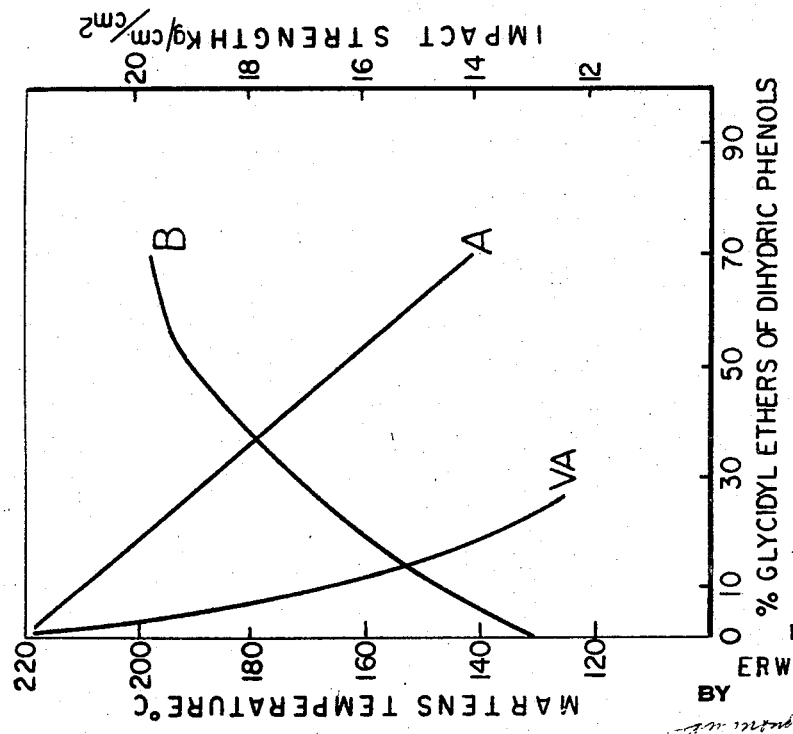

In the drawing, FIGURES 1 and 2 are a graphical representation of the thermal properties A and the flexibility (B and C) of two embodiments of the invention with an increasing amount of glycidyl ethers of dihydric phenols.

The crystallized triglycidyl isocyanurate to be used according to the process of the invention should have an epoxide-oxygen content of at least 14%. The preparation of these crystallized triglycidyl isocyanurates is known as such and described in copending, commonly assigned U.S. patent application S.N. 292,725, filed July 3, 1963 now U.S. Patent No. 3,337,509. This preparation can be carried out by purifying crude reaction products, which are obtained, for example, by reacting cyanuric acid with an excess of epichlorohydrin. By a single or repeated recrystallization from suitable solvents such as methanol, a crystallized triglycidyl isocyanurate with the required epoxide content can be prepared.

The usual organic polyvalent carboxylic acid anhydrides used in the hardening of epoxide resinous compounds can be used as hardening agents. Among others, the following are mentioned: hexahydrophthalic acid anhydride, tetrahydrophthalic acid anhydride, phthalic acid anhydride, methylcyclohexanedicarboxylic acid anhydride, dodecenylsuccinic acid anhydride, pyromellitic acid anhydride, endomethylenetetrahydrophthalic acid anhydride, methylendomethylenetetrahydrophthalic acid anhydride, etc.

The amount of the organic polycarboxylic acid anhydride to be used should be that customarily employed to harden epoxide resinous compounds. In particular, the amount of the polycarboxylic acid anhydride should be chosen so that 0.6 to 1.2, preferably 0.8 to 0.9, of carboxylic acid anhydride groups are present in the hardenable mixture for each epoxide group.

The hardening of the reaction mixtures is carried out under customary conditions at temperatures of 80° to 200° C., particularly 100° to 180° C., over a period of 1 to 20 hours, preferably 2 to 8 hours. In most cases the formation of the hardened epoxide resin is completed after this time. However, to be absolutely sure that the hardening is completed, it is advisable to temper the specimens intended for test purposes for some time at temperatures of about 180° to 210° C.

The mixtures of the process of the invention can be augmented in known manner by the inclusion of dyes or fillers; for example, quartz powder, glass powder, glass fibers, mica, aluminum oxide, titanium oxide, zirconium oxide, pulverized dolomite or barium sulfate.

In the case that, instead of the glycidyl ethers of dihydric phenols recommended for this purpose are used for the internal softening or plasticizing process, commercial polypropylene glycols are used as suggested by the prior art, the Martens temperature of the hardened resins drops considerably even on small additions of the polypropylene glycols (see FIG. 1, curve VA).

The molded bodies or coatings, prepared according to the process of the invention, exhibit good mechanical characteristics, in addition to favorable thermal properties, such as especially a good resistance to deformation under influence of heat and a good thermal mass behavior. The Martens temperature of the hardened epoxide resins of the invention are usually 160° C. or higher. Furthermore, the hardened products show good to very good electrical properties, which are manifested in the resistance to surface leakage of current, in the dielectric loss factor, as well as in the dielectric constant.

The mixtures of the invention can be worked up while being molded into cast and compound masses. The term "molding" includes also the usage of the mixtures as putty, adhesives or as coating agents, for example in the form of a fluidized bed sinter powder.

The following specific embodiments are illustrative of the invention. It is to be understood, however, that they are not to be deemed limitative in any manner.

Example I

Mixtures were prepared consisting of triglycidyl isocyanurate (epoxide-oxygen content, 15.1%), hexahydrophthalic acid anhydride and various amounts of a diglycidyl ether of diphenylol propane (epoxide equivalent, 186). The amount of hexahydrophthalic acid anhydride was measured so that 0.82 mol of hexahydrophthalic acid anhydride was allotted to 1 mole of epoxide oxygen contained in the mixture. In the usual manner, molded slabs measuring 10 x 15 x 120 mm. were prepared from these mixtures and hardened over a period of 3 hours at a temperature of 160° C. Thereafter, these molded slabs were tempered for 20 hours at 200° C. to obtain the constant characteristics. In the following Table I, the first column indicates the content of triglycidyl isocyanurate; the second column gives the content of diglycidyl ether of diphenylol propane, and the following columns indicate the measured Martens temperatures, impact strength, flexural strength and deflection. The testing was conducted according to the DIN-regulations.

In FIG. 1, curve A indicates the curve of the Martens temperature and curve B indicates the curve of the impact strength with increasing amount of the diglycidyl ether of diphenylol propane. For better clarity, the flexural strength and deflection are not shown and have to be derived from the table.

TABLE I

| Triglycidyl Isocyanurate, Percent | Diglycidyl Ether of Diphenylol Propane, Percent | Martens Temp., °C. DIN 53458 | Impact Strength, kg./cm./cm.$^2$ DIN 53453 | Flexural Strength, kg./cm.$^2$ DIN 53452 | Deflection, mm. DIN 53452 |
|---|---|---|---|---|---|
| 100 | --- | 221 | 13 | 710 | 4 |
| 80 | 20 | 201 | 16 | 800 | 5-6 |
| 60 | 40 | 177 | 18 | 910 | 7 |
| *50 | 50 | 166 | 19 | 960 | 8 |
| *40 | 60 | 153 | 19.5 | 1,000 | 8-9 |
| *30 | 70 | 141 | 19.5 | 1,050 | 9-10 |

* With the addition of 0.3% of 2,4,6-tri(N,N-dimethylaminomethyl)-phenol, based on the entire mixture, as accelerating agent.

Example II

Mixtures were prepared consisting of triglycidyl isocyanurate (epoxide-oxygen content, 15.1%), of methylcyclohexanedicarboxylic acid anhydride and of varying amounts of a diglycidyl ether of diphenylol propane (epoxide equivalent, 186). Otherwise the same process was followed as described in Example I. The values obtained according to DIN-specifications are given in Table II.

TABLE II

| Triglycidyl Isocyanurate, Percent | Diglycidyl Ether of Diphenylol Propane, Percent | Martens Temp., °C. DIN 53458 | Impact Strength, kg./cm./cm.$^2$ DIN 53453 | Flexural Strength, kg./cm.$^2$ DIN 53452 | Deflection, mm. DIN 53452 |
|---|---|---|---|---|---|
| 100 | --- | 210 | 12 | 600 | 6 |
| 80 | 20 | 204 | 15 | 700 | 5-6 |
| 60 | 40 | 188 | 17 | 800 | 7-8 |
| *50 | 50 | 178 | 18 | 850 | 8 |
| *40 | 60 | 168 | 19 | 905 | 9 |
| *30 | 70 | 154 | 19.5 | 960 | 9-10 |

* With the addition of 0.3% of 2,4,6-tri-(N,N-dimethlaminomethyl-)phenol, based on the entire mixture, as accelerating agent.

FIG. 2 represents the curve of the Martens temperature as A, and curve C indicates the flexural strength, with increasing amounts of the diglycidyl ether of diphenylol propane.

Example III

The process described in Example I was repeated, but with the difference that the diglycidyl ether of diphenylol propane used had an epoxide equivalent of 398, and that in this case no accelerating agent was employed. The results are to be derived from the following Table III.

TABLE III

| Triglycidyl Isocyanurate, Percent | Diglycidyl Ether of Diphenylol Propane, Percent | Martens Temp., °C. DIN 53458 | Impact Strength, kg./cm./cm.$^2$ DIN 53453 | Flexural Strength, kg./cm.$^2$ DIN 53452 | Deflection, mm. DIN 53452 |
|---|---|---|---|---|---|
| 100 | --- | 221 | 13 | 710 | 4 |
| 80 | 20 | 200 | 16 | 900 | 6 |
| 60 | 40 | 165 | 20 | 1,160 | 8 |
| 40 | 60 | 140 | 23 | 1,230 | 11 |

Example IV

The process described in Example II was repeated, however, with the difference that the diglycidyl ether of diphenylol propane had an epoxide equivalent of 398, and that the addition of the accelerating agent was omitted. Table IV gives the results of the tests.

TABLE IV

| Triglycidyl Isocyanurate, Percent | Diglycidyl Ether of Diphenylol Propane, Percent | Martens Temp., °C. DIN 53458 | Impact Strength, kg./cm./cm.² DIN 53453 | Flexural Strength, kg./cm.² DIN 53452 | Deflection, mm. DIN 53452 |
|---|---|---|---|---|---|
| 100 | --- | 210 | 12 | 600 | 4 |
| 80 | 20 | 192 | 14 | 900 | 6 |
| 60 | 40 | 166 | 17 | 1,000 | 8 |
| 40 | 60 | 140 | 19 | 1,100 | 10 |

COMPARISON TEST

A mixture consisting of triglycidyl isocyanurate (epoxide-oxygen content, 15.1%) and of hexahydrophthalic acid anhydride, was prepared at a ratio of 0.8 mol of hexahydrophthalic acid anhydride to 1 mol of epoxide oxygen. Next, 10% of polypropylene glycol (molecular weight about 490), based on the amount of triglycidyl isocyanurate, were added to this mixture.

The hardening and tempering procedure was carried out as described in Examples 1 and 2. The following values were obtained:

Martens temperature _____ °C__ 165
Impact strength _____ kg./cm./cm.²__ 15
Flexural strength _____ kg./cm.²__ 790

When the amount of polypropylene glycol was increased to 20%, the Martens temperature dropped to 135° C. while the impact strength amounted only to 16 kg./cm./cm.², and the flexural strength was 830 kg./cm.². FIG. 1 illustrates the curve of the Martens temperature, indicated as curve VA.

The preceding specific embodiments are presented as an illustration of the invention. It is to be understood, however, that other expedients known to those skilled in the art can be employed without departing from the spirit of the invention or the scope of the appended claims.

I claim:
1. A process for increasing the flexibility of a hardened epoxide resin based on triglycidyl isocyanurate without substantial effect on its thermal properties which comprises the steps of reacting a mixture consisting of (1) from about 95% to 40% by weight of a crystallized triglycidyl isocyanurate and about 5% to 60% by weight of glycidyl ethers of a dihydric phenol with (2) an organic polycarboxylic acid anhydride epoxide hardener under hardening conditions and recovering said hardened epoxide resin.
2. The process of claim 1 wherein said crystallized triglycidyl isocyanurate has an epoxide oxygen content of at least 14%.
3. The process of claim 1 wherein said glycidyl ethers of a dihydric phenol is present in an amount of from 10% to 40.%
4. The process of claim 1 wherein said glycidyl ethers of a dihydric phenol is a glycidyl ether of diphenylol propane having an epoxide equivalent of between about 170 and about 1200.
5. The process of claim 4 wherein said glycidyl ether of diphenylol propane has an epoxide equivalent of between 180 and 450.
6. A hardened epoxide resin based on triglycidyl isocyanurate having increased flexibility and good thermal properties produced by the process of claim 1.

References Cited
UNITED STATES PATENTS
3,337,509  8/1967  Budnowski.

WILLIAM H. SHORT, Primary Examiner.
T. D. KERWIN, Assistant Examiner.